United States Patent Office 3,801,593
Patented Apr. 2, 1974

3,801,593
1-ACETYL-2-ACETYLIMINO-5-CHLORO-3-PHENYL-3-INDOLINOL, ACETATE
Stanley C. Bell, Penn Valley, and Peter H. L. Wei, Springfield, Pa., assignors to American Home Products Corporation, New York, N.Y.
No Drawing. Application Jan. 13, 1970, Ser. No. 7,304, now Patent No. 3,686,210, dated Aug. 22, 1972, which is a division of abandoned application Ser. No. 694,089, Dec. 28, 1967. Divided and this application Feb. 17, 1972, Ser. No. 227,275
Int. Cl. C07d 27/38
U.S. Cl. 260—326.11 R       1 Claim

ABSTRACT OF THE DISCLOSURE

The invention is directed to 2-acylamido-3-aryl-3H-indol-3-ol esters and their hydrolysis derivatives. The compounds have central nervous system activity as depressants or may be used as intermediates in the preparation of compounds that have such activity.

---

This application is a division of our application 7,304 filed Jan. 13, 1970 which issued as Pat. 3,686,210 on Aug. 22, 1972 which was in turn a division of application 694,089 filed Dec. 28, 1967 which was abandoned.

This invention relates to new and novel 2-acylamido-3-aryl-3H-indol-3-ol esters, related compounds thereto and the process for their preparation. In particular, this invention is concerned with 2-acylamido-3-aryl-3H-indol-3-ol esters, 1-acyl-2-acylimino-3-aryl-3-indolinol esters, 1-acyl-3-aryloxindole esters and 3-aryl-3-hydroxyoxindoles.

The compounds within the purview of the present invention are exemplified by those having the following formula:

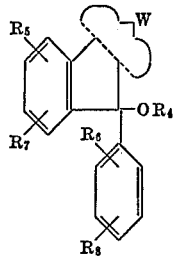

where
W is

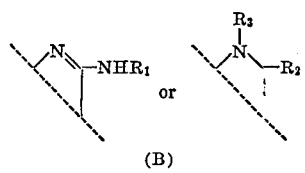

$R_1$ is lower alkanoyl;
$R_2$ is oxo or lower alkanoylimino;
$R_3$ is hydrogen or lower alkanoyl;
$R_4$ is hydrogen, or lower alkanoyl;
$R_5$ and $R_6$ are hydrogen, halogen, lower alkyl, or lower alkoxy; and
$R_7$ and $R_8$ are hydrogen, sulfamoyl, or lower alkanoylamido-sulfonyl, with the proviso that when $R_4$ is lower alkanoyl it is the same as $R_1$.

As used herein the terms "lower alkyl," "lower alkoxy," "lower alkanoyl," and the like, describe groups containing from one to eight carbon atoms.

A typical example of the compounds of this invention which are depicted by structural Formula (I)(A) is 2-acetamido-5-chloro-3-phenyl-3H-indol-3-ol, acetate. Alternatively, the compounds of this invention which are represented by structural Formula (I)(B) are typified by:

1-acetyl-2-acetylimino-5-chloro-3-phenyl-3-indolinol, acetate;
1-acetyl-5-chloro-3-hydroxy-3-phenyloxindole, acetate;
3-(5-acetamidosulfonyl-2-chlorophenyl)-1-acetyl-5-chloro-3-hydroxyoxindole, acetate; and
5-chloro-3-hydroxy-3-phenyloxindole.

The new and novel compounds of this invention may be prepared by the process which is hereinafter schematically illustrated.

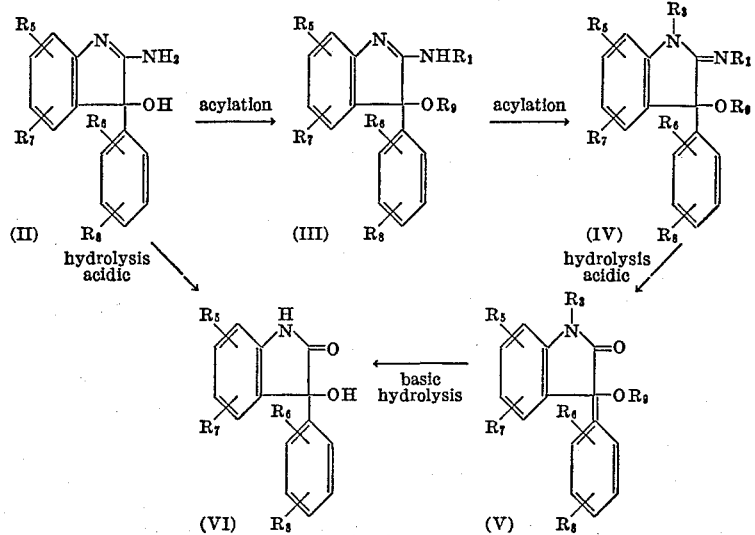

where $R_1$, $_3$ and $R_5$–$R_8$ are defined as above; and $R_9$ is lower alkanoyl with the proviso that $R_1$ and $R_9$ are the same. Preferably, $R_3$ is the same as $R_1$ and $R_9$.

To prepare the 2-acylamido-3-aryl-3H-indol-3-ol esters (III) and the 1-acyl-2-acylimino-3-aryl-3-indolinol esters (IV) of the present invention, a 2-amino-3-aryl-3H-indol-3-ol (II) is contacted with a carboxylic acid anhydride, e.g., acetic anhydride, for a period of about five minutes to about five hours at a temperature range from about room temperatures to about reflux temperatures. When the acylation is complete, the reaction mixture is evaporated to dryness, and the products are recovered and separated by well-known techniques, for instance by fractional recrystallization. When the above reaction is conducted at lower temperatures for relatively short periods, a preponderance of the 2-acylamido-3-aryl-3H-indol-3-ol esters (III) is produced. Alternatively, when the reaction is conducted at higher temperatures for relatively long periods, a preponderance of 1-acyl-2-acylimino-3-aryl-3-indolinol esters (IV) is produced.

The 1-acyl-3-aryloxindol esters (V) of the present invention may also be prepared by the acidic hydrolysis of the above-prepared 1-acyl-2-acylimino-3-aryl-3-indolinol esters (IV), for example, the latter compound is suspended in an organic solvent, such as dioxane, dimethoxyethane and alkanols, preferably ethanol, and acidified, for instance with hydrochloric acid, at about room temperature. Thereafter, the reaction mixture is agitated for a period of about fifteen minutes to about five hours and then filtered to separate the precipitated 1-acyl-3-aryloxindole ester (V).

If the above prepared 1-acyl-3-aryloxindol esters (V) are subjected to basic hydrolysis, the corresponding 3-aryl-3-hydroxyoxindoles (VI) are prepared. For example an appropriate 1-acyl-3-aryloxindol ester (V) is admixed with a strong base, such as sodium hydroxide, for a period of about fifteen minutes to about five hours at a temperature range from about room temperature to about 50° C., preferably at room temperature. Thereafter, the product is acidified, e.g. with acetic acid, to precipitate the product which is separated by filtration to afford the corresponding 3-aryl-3-hydroxyindole (VI).

The 3-aryl-3-hydroxyoxindoles may alternatively be prepared by the reaction of a 2-benzoyl-acetanilide and an ionic cyanide in the presence of a proton donor, such as water. The reaction sequence includes a number of intermediates which are neither separated nor recovered. A 2 - amino-3-aryl-3H-indol-3-ol (II) is formed when the reaction mixture is refluxed for extended periods of about eight hours or longer. Upon standing for an extended period of about 160 hours or longer, in acidic solution, the 2 - amino-3-aryl-3H-indol-3-ol (II) is hydrolyzed to the corresponding 3-aryl-3-hydroxyoxindole (VI).

The 2-amino-3-aryl-3H-indol-3-ols (II) which are used as starting materials to prepare the compounds of the present invention may be prepared as described in copending and cofiled U.S. patent application of S. C. Bell and C. Gochman, entitled "A Process for the Preparation of 3-Aryl-2-Imino-3-Indolinols and 3-Aryl-2-Amino-3H-Indol-3-Ols" which issued as Pat. 3,576,001 on Apr. 20, 1971.

The new and novel 2 - acylamido-3-aryl-3H-indol-3-ol esters (III) or the present invention are useful as intermediates in the preparation of the 1-acyl-2-acylimino-3-aryl-3-indolinol esters (IV) of this invention which may be utilized as intermediates in the preparation of the 1-acyl-3-aryloxindole esters (V), hereof, which may in turn be utilized as intermediates in the preparation of the 3-aryl-3-hydroxyoxindoles (VI) hereof.

The new and novel 2 - acylamido-3-aryl-3H-indol-3-ol esters (III); the 1 - acyl-2-acylimino-3-aryl-3-indolinol esters (IV); and the 1-acyl-3-aryloxindol esters (V) and the 3-hydroxy-3-phenyloxindoles (VI) of this invention have utility in experimental and comparative pharmacology. In this regard compounds (V) and (VI) are central nervous system depressants.

In the pharmacological evalution of the biological activity of the compounds of this invention, the in vivio effects are tested as follows. The compound is administered orally or intraperitoneally to three mice (14 to 24 grams) at each of the following doses: 400, 127, 40 and 12.7 mg./kg. The animals are watched for a minimum of two hours during which time signs of general stimulation, (i.e., increased spontaneous motor activity, hyperactivity on tactile stimulation, twitching), general depression (i.e., decreased spontaneous motor activity, decreased respiration) autonomic activity (i.e. miosis, mydriasis diarrhea) are noted.

The 1-acyl-3-aryloxindole esters (V) and 3-hydroxy-3-aryloxindoles (VI) induce central nervous system depressant effects at 127 to 400 mg./kg. of host body weight.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions which may contain coloring and flavoring agents or they may be injected parenterally, that is intra-muscularly, intravenously or subcutaneously. For parenteral administration they may be used in the form of a sterile solution containing other solutes, for example, enough saline or glucose to make the solution isotonic.

The dosage of the present therapeutic agent will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claim.

EXAMPLE I

The following example illustrates the preparation, from a compound of Formula II, of a compound of Formula III, the latter being 2 - acetamido-5-chloro-3-phenyl-3H-indol-3-ol, acetate.

A mixture of 2.0 grams (g.) of 2-amino-5-chloro-3-phenyl-3H-indol-3-ol and 30 milliliters (ml.) of acetic anhydride is warmed on a steam bath for 15 minutes (min.) and then concentrated to dryness. Fractional crystallization of the residue from ethanol gives 1.0 g. of product. Recrystallization from ethanol gives the pure compound 2-acetamido-5-chloro-3-phenyl-3H-indol-3-ol, acetate having a melting point of 199–200° C.

Based on the formula $C_{18}H_{15}ClN_2O_3$, it was calculated that the elemental analysis by weight would be 63.07 percent carbon, 4.41 percent hydrogen, 8.18 percent nitrogen and 10.35 percent chlorine. The product was analyzed and the content was found to be 62.97 percent carbon, 4.35 percent hydrogen, 8.12 percent nitrogen and 10.5 percent chlorine. The foregoing may be expressed:

*Analysis.*—Calculated for $C_{18}H_{15}ClN_2O_3$: C, 63.07; H, 4.41; N, 8.18; Cl, 10.35. Found (percent): C, 62.97; H, 4.35; N, 8.12; Cl, 10.5.

In a similar manner, reacting an appropriate 2-amino-3-aryl-3H-indol-3-ol with an appropriate carboxylic acid anhydride as described above, affords the following compounds:

(A) 4-fluoro-3-(3-fluoro-5-sulfamoylphenyl)-2-propionamido-6-sulfamoyl-3H-indol-3-ol, propionate;
(B) 2-butyrylamido-4-fluoro-3-(m-fluorophenyl)-3H-indol-3-ol, butyrate;
(C) 5-fluoro-3-(m-fluorophenyl)-2-valeramido-3H-indol-3-ol, valerate;
(D) 2-acetamido-5-bromo-3-(m-bromophenyl)-3H-indol-3-ol, acetate;
(E) 2-acetamido-5-iodo-3-(m-iodophenyl)-3H-indol-3-ol, acetate;
(F) 2-acetamido-5-methyl-3-(m-methylphenyl)-3H-indol-3-ol, acetate;
(G) 2-acetamido-5-butyl-3-(m-butylphenyl)-3H-indol-3-ol, acetate;
(H) 2-acetamido-5-ethyl-3-(m-propylphenyl)-3H-indol-3-ol, aceeate;
(I) 2-acetamido-5-methoxy-3-(m-methoxyphenyl)-3H-indol-3-ol, acetate;
(J) 2-acetamido-5-butoxy-3-(m-propionoxyphenyl)-3H-indol-3-ol, acetate;
(K) 2-acetamido-4-acetamidosulfonyl-6-ethoxy-3-(m-ethoxyphenyl)-3H-indol-3-ol, acetate.

EXAMPLE II

The following example illustrates the preparation, from a compound of Formula II, of a compound of Formula IV, in which the compounds of Formula III are intermediates that are not separated or recovered. The product is 1-acetyl - 2 - acetylimino - 5 - chloro - 3 - phenyl - 3 - indolinol, acetate.

A mixture of 4.0 g. of 2-amino-5-chloro-3-phenyl-3H-indol-3-ol and 50 ml. of acetic anhydride is refluxed for 1 hour (hr.) and then concentrated to dryness. The residue is fractionally crystallized from ethanol to give 2.5 g. of 1 - acetyl - 2 - acetylimino - 5 - chloro - 3 - phenyl - 3 - indolinol, acetate having a melting point of 150–152° C. A second recrystallization from cyclohexane raises the melting point to 152–154° C.

*Analysis.*—Calculated for $C_{20}H_{17}ClN_2O_4$: C, 62.43; H, 4.45; N, 7.28; Cl, 9.23 Found (percent): C, 61.91; H, 4.46; N, 7.28; Cl, 9.1.

In a similar manner, reacting an appropriate 3-aryl-3H-indol-3-ol with an appropriate carboxylic acid anhydride as described above affords the following compounds:

(A) 4-fluoro-3-(3-fluoro-5-sulfamoylphenyl)-2-propionylimino-1-propionyl-6-sulfamoyl-3-indolinol, propionate;
(B) 2-butyrylimino-1-butyryl-5-fluoro-3-(m-fluorophenyl)-3-indolinol, butyrate;
(C) 5-fluoro-3-(m-fluorophenyl)-2-valerylimino-1-valeryl-3-indolinol, valerate;
(D) 1-acetyl-2-acetylimino-5-bromo-3-(m-bromophenyl)-3-indolinol, acetate;
(E) 1-acetyl-2-acetylimino-5-iodo-3-(m-iodophenyl)-3-indolinol, acetate;
(F) 1-acetyl-2-acetylimino-5-methyl-3-(m-methylphenyl)-3-indolinol, acetate;
(G) 1-acetyl-2-acetylimino-5-butyl-3-(m-butylphenyl)-3-indolinol, acetate;
(H) 1-acetyl-2-acetylamino-5-ethyl-3-(m-propylphenyl)-3-indolinol, acetate;
(I) 1-acetyl-2-acetylimino-5-methoxy-3-(m-methoxyphenyl)-3-indolinol, acetate,
(J) 1-acetyl-2-acetylimino-5-butoxy-3-(m-propionoxyphenyl)-3-indolinol, acetate;
(K) 1-acetyl-2-acetylimino-6-acetamidosulfonyl-4-ethoxy-3-(m-ethoxyphenyl)-3-indolinol, acetate.

EXAMPLE III

The following example illustrates the proportion, from a compound of Formula II, of a compound of Formula V, in which the compounds of Formulas III and IV are intermediates but are not separated or recovered from the reaction mixture. The product is 3-(5-acetimidosulfonyl-2-chlorophenyl)-1 - acetyl - 5 - chloro - 3 - hydroxyoxindole, acetate.

A mixture of 2.0 g. of 2-amino-5-chloro-3-(2-chloro-5-sulfamoylphenyl)-3H-indol-3-ol and 50 ml. of acetic anhydride is heated on a steam bath for one hour and then evaporated to dryness in vacuo and let stand in air. Recrystallization of the residue twice from ethanol yields 1.2 g. of product, 3-(5-acetamido-sulfonyl-2-chlorophenyl)-1-acetyl-5-chloro-3-hydroxyoxindole, acetate, obtained as the hemi-alcoholate and having a melting point of 205–210° C.

*Analysis.*—Calculated for $C_{20}H_{16}Cl_2N_2O_7S \cdot \frac{1}{2}C_2H_6O$: C, 48.28; H, 3.67; N, 5.36; Cl, 13.57; S, 6.14. Found (percent): C, 48.53; H, 3.45; N, 5.41; Cl, 13.4; S, 6.10.

EXAMPLE IV

The following example illustrates the preparation from a compound of Formula IV, of a compound of Formula V the product being 1-acetyl-5-chloro-3-hydroxy-3-phenyloxindole, acetate.

To a suspension of 2.0 g. of 1-acetyl-2-acetylimino-5-chloro-3-phenyl-3-indolinol, acetate in 20 ml. of ethanol is added 2 ml. of 6 N hydrochloric acid. After stirring the solution for 45 min. the precipitate is filtered giving 0.9 g. of product, 1-acetyl-5-chloro-3-hydroxy-3-phenyloxindole, acetate, having a melting point of 150–152° C.

*Analysis.*—Calculated for $C_{18}H_{14}ClNO_4$: C, 62.89; H, 4.10; N, 4.08; Cl, 10.31. Found (percent): C, 62.97; H, 4.04; N, 3.90; Cl, 10.20.

In a similar manner, reacting an appropriate 1-acyl-2-acylimino - aryl - 3 - indolinol, ester with an appropriate acid, as described above, affords the following compounds:

(A) 4-fluoro-3-(3-fluoro-5-sulfamoylphenyl)-3-hydroxy-1-propionyl-6-sulfamoyloxindole, propionate;
(B) 1-butyryl-5-fluoro-3-(m-fluorophenyl)-3-hydroxyoxindole, butyrate;
(C) 5-fluoro-3(m-fluorophenyl)-3-hydroxy-1-valeryloxindole, valerate;
(D) 1-acetyl-5-bromo-3-(m-bromophenyl)-3-hydroxyoxindole, acetate;
(E) 1-acetyl-3-hydroxy-5-iodo-3-(m-iodophenyl)-oxindole, acetate;
(F) 1-acetyl-3-hydroxy-5-methyl-3-(m-methylphenyl)-oxindole, acetate;
(G) 1-acetyl-5-butyl-3-(m-butylphenyl)-3-hydroxyindole, acetate;
(H) 1-acetyl-5-ethyl-3-hydroxy-3-(m-propylphenyl)-oxindole, acetate;
(I) 1-acetyl-3-hydroxy-5-methoxy-3-(m-methoxyphenyl)-oxindole, acetate;
(J) 1-acetyl-5-butoxy-3-hydroxy-3-(m-propionoxyphenyl)-oxindole, acetate;
(K) 1-acetyl-4-acetamidosulfonyl-6-ethoxy-3-(m-ethoxyphenyl)-3-hydroxyindole, acetate.

EXAMPLE V

The following example illustrates the preparation, from a compound of Formula V, of a compound of Formula VI, the latter being 5-chloro-3-hydroxy-3-phenyloxindole.

To a suspension of 0.8 g. of 1-acetyl-5-chloro-3-hydroxy-3-phenyloxindole, acetate in ethanol is added sodium hydroxide. After standing for about 15 minutes at room temperature the resultant solid is collected. The compound, 5-chloro-3-hydroxy-3-phenyloxindole, is recrystalized from benzene and has a melting point of 235–237° C.

*Analysis.*—Calculated for $C_{14}H_{10}ClNO_2$: C, 64.75; H, 3.88; N, 5.39; Cl, 13.66. Found (percent): C, 65.01; H, 3.84; N, 5.66; Cl, 13.5.

In a similar manner, reacting an appropriate 1-acyl-3-aryloxindole, ester (V) with an appropriate base, as described above, affords the following compounds:

(A) 4-fluoro-3-(3-fluoro-5-sulfamoylphenyl)-6-sulfamoyl-3-hydroxyoxindole;
(B) 5-fluoro-3-(m-fluorophenyl)-3-hydroxyoxindole;
(C) 5-bromo-3-(m-bromophenyl)-3-hydroxyoxindole;
(D) 3-hydroxy-5-iodo-3-(m-iodophenyl)-oxindole;
(E) 3-hydroxy-5-methyl-3-(m-methylphenyl)-oxindole;
(F) 5-butyl-3-(m-butylphenyl)-3-hydroxyoxindole;
(G) 5-ethyl-3-hydroxy-3-(m-propylphenyl)-oxindole;
(H) 3-hydroxy-5-methoxy-3-(m-methoxyphenyl)-oxindole;
(I) 5-butoxy-3-hydroxy-3-(m-propionoxyphenyl)-oxindole;
(J) 4-acetamidosulfonyl-6-ethoxy-3-(m-ethoxyphenyl)-3-hydroxyoxindole.

EXAMPLE VI

The following example illustrates an alternate method of preparation of a compound of Formula VI from a 2-benzoylacylanilide and an ionic cyanide.

A mixture of 48.3 g. of 2-benzoyl-3,4'-dichloropropionanilide, 11.7 g. of potassium cyanide, 300 ml. of dimethoxyethane and 25 ml. of water is refluxed for 9 hrs. and the reaction mixture cooled and filtered. The filtrate is concentrated to dryness, the residue dissolved in benzene, and washed first with a sodium carbonate solution and then with a dilute acetic acid solution. The benzene in partially concentrated and the precipitate is collected and found to be 5-chloro-3-hydroxy-3-phenyloxindole having the same analysis as the product of Example V.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:
1. 1-acetyl-2-acetylimino-5-chloro-3-phenyl-3-indolinol, acetate.

References Cited

Angyal et al.: Chem. Abs., vol. 51: 12097–12099 (1957).
Bruce et al.: Chem. Abs., vol. 52:7274–5 (1958).
Mills et al.: Chem. Abs., vol. 56: 14154b (1962).
Kornowski: Chem. Abs., vol. 60: 4089e (1964).

JOSEPH A. NARCAVAGE, Primary Examiner